United States Patent

Schoetz

[19]

[11] Patent Number: 6,007,109
[45] Date of Patent: Dec. 28, 1999

[54] SEALING ELEMENT FOR A HYDRAULIC SCREW CONNECTION COMPRISING A HOLLOW SCREW AND AN ANNULAR STUB

[75] Inventor: Alfons Schoetz, Rutesheim, Germany

[73] Assignee: Robert Bosch GmbH, Stuttgart, Germany

[21] Appl. No.: 08/894,467

[22] PCT Filed: Oct. 31, 1996

[86] PCT No.: PCT/DE96/02074

§ 371 Date: Aug. 20, 1997

§ 102(e) Date: Aug. 20, 1997

[87] PCT Pub. No.: WO97/23745

PCT Pub. Date: Jul. 3, 1997

[30] Foreign Application Priority Data

Dec. 21, 1995 [DE] Germany ........................ 195 47 891

[51] Int. Cl.$^6$ ................... F16L 5/00; F16J 15/02
[52] U.S. Cl. ................... 285/190; 277/607; 277/644
[58] Field of Search ........................ 277/615, 616, 277/626, 607, 630, 644; 285/190, FOR 140

[56] References Cited

U.S. PATENT DOCUMENTS 3,215,400  11/1965  Muller ........................ 277/644
4,775,174  10/1988  Dalla Bona ........................ 285/190

FOREIGN PATENT DOCUMENTS 217062  6/1924  United Kingdom ........................ 285/190

*Primary Examiner*—Eric K. Nicholson
*Assistant Examiner*—Gary Grafel
*Attorney, Agent, or Firm*—Edwin E. Greigg; Ronald E. Greigg

[57] ABSTRACT

A sealing element for a hydraulic screw connection, comprising a hollow screw and an annular stub, for securing a rigid or flexible line connected or connectable to the annular stub and to a hydraulic component, wherein the annular stub is fixed in a pressure medium-tight fashion, via its plane end faces, between a head of the hollow screw and the component and swiveled into an arbitrary angular position relative to the component about the center line of the hollow screw. Two sealing element regions disposed in sealing seams located between the head of the hollow screw and the annular stub and between the component and the annular stub, are joined via a substantially cylindrical portion, and this cylindrical portion. This portion extends in the seam concentric with the largely cylindrical wall of the hollow screw. It has at least one radial opening.

3 Claims, 1 Drawing Sheet

6,007,109

SEALING ELEMENT FOR A HYDRAULIC SCREW CONNECTION COMPRISING A HOLLOW SCREW AND AN ANNULAR STUB

PRIOR ART

The invention is based on a sealing element for a hydraulic screw connection, comprising a hollow screw and an annular stub.

Many versions of such angle-swivel screw connections are known. These screw connections are used when a pipe or hose carrying a pressure medium is to be connected to a hydraulic component, such as a hydraulic or pneumatic cylinder, a hydraulic motor, an injection pump, a valve, etc., where the line cannot be extended away from the corresponding component at a right angle. The functional diagram of these connections is usually the same. The rigid or flexible line ends in an annular stub. In principle, it is formed of two lengths of pipe connected in a T. The line is connected to the free end of the bottom of the T. A hollow screw is inserted through the cross bar of the T-shaped component and for instance is screwed into a threaded bore of a cylinder connection stub. The pressure medium flows for instance from the line via the annular stub and the hollow screw into the cylinder chamber.

To seal off the annular stub from the hollow screw and the corresponding hydraulic element, a sealing disk is placed on the one hand between the head of the hollow screw and the annular stub and on the other between the annular stub and the hydraulic component. This is done when the piping or hose assembly is mounted on site. It often happens that the mechanic fails to observe the structurally dictated correct disposition of sealing disks. Often two sealing disks are placed between the head of the hollow screw and the annular stub and in return the sealing disk between the hydraulic component and the annular stub is left out. Such installation errors sometimes cause functional problems, and where oil is the pressure medium they also lead to contamination of the hydraulic component assemblies.

To avoid the disadvantages of the prior art described, a sealing element needs to be created that can neither be left out nor installed incorrectly by the mechanic on site.

ADVANTAGES OF THE INVENTION

The sealing element according to the invention contains the two known sealing disks, which it connects to one another via a length of pipe or via struts; the length of pipe or the struts are disposed in the seam between the hollow screw and the annular stub. As a result, the sealing element is disposed in captive fashion in the annular stub.

The shapes and proportional sizes of the individual sealing element regions are recited inter alia herein and/or the description of the drawings.

Various proposals are made for the embodiment of the cylindrical sealing element region. For instance, the wall of the cylindrical sealing element region can be made thinner halfway up the height—that is, at approximately the height of the pressure medium-carrying transverse bores of the hollow screw—than in the remaining region. As a result, on the one hand the cross section of the conduit between the hollow screw and the annular stub becomes larger, and on the other the thin-walled region, when the hollow screw is tightened, can yield to upsetting of the sealing element by denting or bulging.

Another alternative is to use struts. The struts may for instance extend in skewed fashion relative to the center line of the hollow screw, so that they have a helical contour. If in this form of construction the two plane sealing element regions are moved toward one another, for instance when the hollow screw is tightened, then the struts move closer together; in other words, the pitch of the helical line becomes less. With this structural form, a sealing element that is suitable for various heights of an annular stub is also created.

In addition, there may be a recess on the annular stub that is engaged by a corresponding counterpart of the sealing element, such as a lug or other protruding part. In this way, the sealing element is seated in the annular stub in a way secure against relative rotation, thus preventing the wall or a region of the wall of the cylindrical sealing element region from being located in a throttling way upstream of the line connected in the annular stub. The recess is preferably located outside the plane sealing seams, so as not to impair the sealing function.

BRIEF DESCRIPTION OF THE DRAWING

Further details of the invention will become apparent from the ensuing description of a schematically illustrated embodiment in FIG. 1.

DESCRIPTION OF THE EXEMPLARY EMBODIMENT

Figure 1:
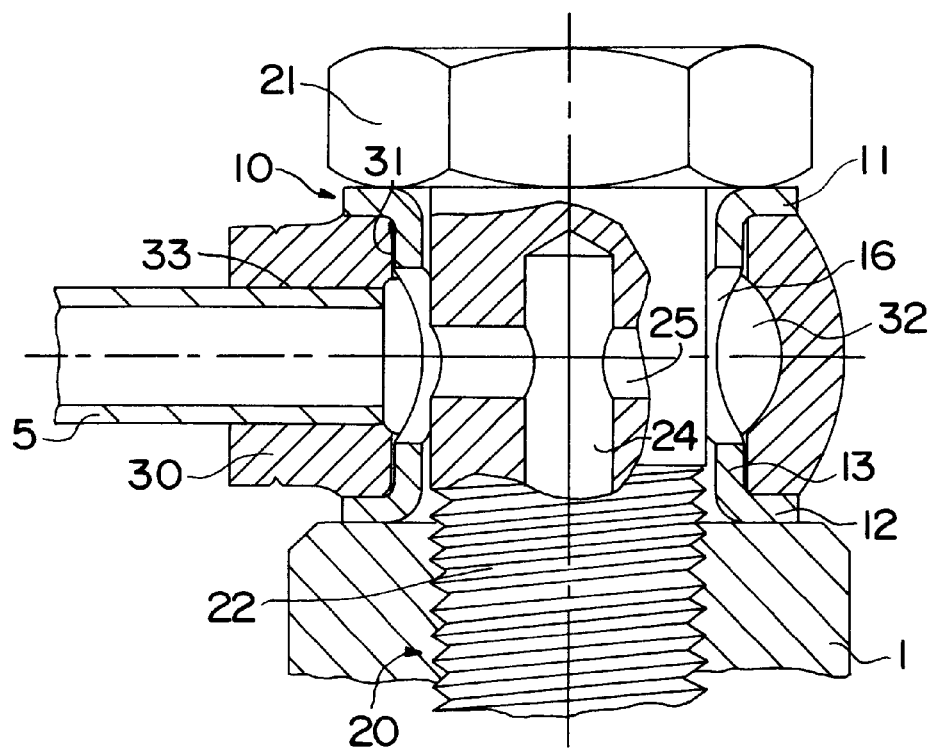

FIG. 1 shows a longitudinal section through an angle-swiveling screw connection. The screw connection comprises three parts. These are a hollow screw (20), an annular stub (30), and the sealing element (10) located between these two parts.

As a rule, the hollow screw (20) has a hexagonal, flat head (21). The shaft (22) of the hollow screw (20) is drilled open from its threaded end in order to make a longitudinal bore (24). Just before the end of the longitudinal bore (24) located under the head (21) of the hollow screw, the bore is intersected by at least one transverse bore (25). The transverse bore (25), whose diameter here is less than the diameter of the longitudinal bore (24), is located approximately halfway up the height of the annular stub (30).

The annular stub (30) comprises a stub with a tubular part formed onto it. The stub here has a cylindrical bore (31). An internal annular conduit (32) machined into the bore (31) halfway along its height. The outer contour located between the end faces of the stub is curved spherically. As shown in FIG. 1, the stub is configured into the formed-on tubular part on the left. A connecting bore (33) is located on the tubular part, with its center line intersecting the center line of the hollow screw at a right angle. The connecting bore (33) ends in the internal annular conduit (32). A hydraulic line in the form of a tube or pipe (5) is secured by press-fitting in the connecting bore (33). The width of the internal annular conduit (32) is slightly greater than the outer diameter of the hydraulic pipe (5) in the region of the annular stub (30).

The sealing element (10) is seated between the hollow screw (20) and the annular stub (30). In the exemplary embodiment shown, this sealing element comprises two plane, annular portions (11, 12) and a tubular portion (13) connecting between them. The annular portions (11, 12) and the tubular portion (13) here have the same wall thickness, at least before the hollow screw (20) is tightened.

The annular portions (11, 12) are located in the sealing seams, one between the lower head side of the hollow screw (20) and the upper end face of the annular stub (30) and the other between the lower end face of the annular stub (30)

and an outer wall, facing it, of a hydraulic component (1) to which the angle-swivel screw connection is connected. The outer diameter of the annular portions (11, 12) is greater, by at least the maximum, double wall thickness of the tubular portion (13), than the inside diameter of the annular stub (30).

The length of the tubular portion (13) is at least as great as the height of the annular stub (30) between its two end faces. The inside diameter of the tubular portion (13) is greater than the outer diameter of the hollow screw shaft (22).

Halfway along the height of the tubular portion (13), this portion has two opposed transverse bores (16). The diameter of the transverse bores (16) is greater than the width of the internal annular conduit (32).

The sealing element (10), before being secured to the annular stub (30), is in the form of a semifinished part. It has the form of a tube or pipe. One edge of the tube is optionally crimped open. This crimped-open edge forms one of the annular portions (11) or (12). Preferably the one crimped end is the portion (11) of FIG. 1. The other annular portion is created by a deforming operation, which takes place once the semifinished part has been inserted into the stub (30). In case the semifinished part, then does not have a crimped open edge both ends of the pipe will be deformed simultaneously after the pipe had been inserted into the annular stub (30).

Thus for the later installation of the angle-swivel screw connection, the annular stub (30) with a premounted sealing element (10) is available. The sealing element (10), which comprises a tough, cold-deformable material such as copper, brass, an aluminum alloy, or the like, is seated firmly or with slight play in captive fashion in the annular stub (30).

For installation, the annular stub (30) together with the built-in sealing element (10) is secured to the component (1) via the hollow screw (20). After the annular stub (30) has been aligned with respect to its angular position relative to the component (10), the hollow screw (20) is tightened. To achieve a reliable sealing action, the sealing element (10) is deformed at least in the region of the plane sealing seams.

In the installed angle-swivel screw connection, the pressure medium flows from the hydraulic line (5) via the internal annular conduit (32), and the transverse bores (16) and (25), into the longitudinal bore (24). Depending on the function of the hydraulic component (1), the pressure medium also flows in the opposite direction.

The foregoing relates to preferred exemplary embodiments of the invention, it being understood that other variants and embodiments thereof are possible within the spirit and scope of the invention, the latter being defined by the appended claims.

The invention claimed and desired to be secured by Letters Patent of the United States is:

1. A hydraulic screw connection, including a sealing element comprising a hollow screw (20) and an annular stub (30) that has plane end faces, for securing a rigid or flexible line connected or connectable to the annular stub to a hydraulic component, wherein the annular stub is fixed snugly in a pressure-tight fashion, via the plane end faces, between a head of the hollow screw and a component, and swiveled into an arbitrary angular position relative to the component about a center line of the hollow screw, two sealing element regions (11, 12) are disposed in sealing seams located between the head (21) of the hollow screw and the annular stub (30) and between the component (1) and the annular stub (30), said two sealing element regions (11, 12) are joined via a substantially cylindrical portion (13), and this cylindrical portion (13) extends in the sealing seams concentric with a largely cylindrical wall of the hollow screw (20), the cylindrical portion (13) has at least one radial opening (16), and the hollow screw has a longitudinal bore (24) which is intersected by a transverse bore (25).

2. A hydraulic screw connection, including a sealing element in accordance with claim 1, in which the two sealing element regions (11, 12) are located in substantially parallel planes.

3. A hydraulic screw connection, including a sealing element in accordance with claim 1, in which the at least one radial opening (16) in the wall of the cylindrical sealing element portion (13) is disposed approximately halfway along a height of the sealing element (10).

* * * * *